United States Patent [19]

Sakagami

[11] 4,376,543
[45] Mar. 15, 1983

[54] DUST EXCLUDING DEVICE

[75] Inventor: Seiji Sakagami, Kanagawa, Japan

[73] Assignee: Mitutoyo Mfg. Co., Ltd., Tokyo, Japan

[21] Appl. No.: 268,402

[22] Filed: May 29, 1981

[30] Foreign Application Priority Data

Aug. 15, 1980 [JP] Japan .................. 55-115689[U]

[51] Int. Cl.³ .............................................. F16J 15/16
[52] U.S. Cl. .................. 277/237 R; 277/12; 277/DIG. 4; 277/DIG. 7; 308/3.5
[58] Field of Search .............. 177/179, 180; 277/32, 277/12, DIG. 7, 237 A, DIG. 4; 308/3.5; 92/88

[56] References Cited

U.S. PATENT DOCUMENTS 2,303,438 12/1942 Cornelius ........................... 308/3.5
3,428,272 2/1969 Feder ................................ 92/88 X
4,057,258 11/1977 Ernst ................................ 277/12

FOREIGN PATENT DOCUMENTS 2746718 4/1979 Fed. Rep. of Germany .

Primary Examiner—Joseph W. Hartary
Attorney, Agent, or Firm—Koda and Androlia

[57] ABSTRACT

A dust excluding device for a linear scale type measuring instrument which comprises; flexible shield members disposed at opposite sides of an opening formed in a hollow casing along a line of movement of a movable member and having the forward ends thereof being brought into abutting contact with each other; and a neck adapted to locally push open the abutting contact portions of the shield members, for imparting a displacement of the movable member at the outside of said hollow casing to the interior of said hollow casing through said opening; characterized in that the end portions of said neck in the moving directions thereof are each formed into a letter 'V' shape, the tip of which obliquely recedes from inside to outside of said hollow casing.

6 Claims, 7 Drawing Figures

DUST EXCLUDING DEVICE

BACKGROUND OF THE INVENTION

1. Field of the Invention

This invention relates to dust excluding devices, and particularly to improvements in a dust excluding device suitable for use in a linear scale type measuring instrument and including flexible shield members disposed at opposite sides of an opening formed in a hollow casing along a line of movement of a movable member and having the forward ends being brought into abutting contact with each other, and a neck adapted to locally push open the abutting contact portions of the shield members, for imparting a displacement of the movable member at the outside of the hollow casing to the interior of the hollow casing through the opening.

2. Description of the Prior Art

In general, in the case of measuring a value of movement between articles movable relative to each other such for example as a value of movement of a measuring element relative to its main body, a value of movement of a slider with respect to a column and the like by use of a measuring instrument for measuring a length and the like of an article, there have been known linear scale type measuring instruments, in each of which a linear scale is fixed at one side and a detector including an index scale is fixed at the other side, whereby a value of a relative displacement between the linear scale and the detector is photoelectrically read.

The linear scale type measuring instrument of the type described, for example, comprises: a hollow casing fixed on a bed of a machine tool; a linear scale housed in and fixed to the hollow casing; a slider movable along the linear scale and mounted thereon with an index scale provided thereon with graduation fringes disposed adjacent graduation fringes of the linear scale; a detector movable with a workpiece or a tool; and a connecting mechanism for imparting a displacement of the detector to the slider disposed in the hollow casing. In the linear scale type measuring instruments as described above, there has been used a dust excluding device, such for example as shown in FIG. 1, comprising: flexible shield members 14, 16 made of rubber for example, disposed at opposite sides of an opening 12a formed along a line of movement of a detector 10 being a movable member and having the forward ends 14a, 16a being brought into abutting contact with each other; and a neck 18 adapted to locally push open the abutting contact portions of the shield members 14, 16, for imparting a displacement of the movable member at the outside of the hollow casing 12 to the interior of the hollow casing 12 through the opening 12a. In addition, both the linear scale disposed along the opening 12a of the hollow casing 12 and the slider adapted to travel along the linear scale with a predetermined distance being held from the linear scale in accordance with a displacement of the detector 10 are housed in the hollow casing 12, whereby a displacement of the detector 10 is imparted to the slider through a cantilever spring or the like provided on the neck 18 at the inner side of the hollow casing 12. By use of the dust excluding device as described above, at the portion of the hollow casing 12 where the neck 18 is not present, a slidably guiding surface of the linear scale for the slider in the hollow casing 12 is covered by the shield members 14, 16, so that dust can be excluded from intruding onto the slidably guiding surface. However, heretofore, the end portion of the neck 18 in the moving directions thereof, which are inserted through the shield members 14, 16, have been each formed into a letter 'V' shape vertically upstanding with respect to a shielding surface formed by the shield members 14, 16 as shown in FIG. 2, and consequently, when the detector 10 moves in a direction indicated by an arrow A, the shield members 14, 16 are pushed open to the opposite sides. In this case, gaps B are formed between the side edges of the shield members 14, 16, which have been in abutting contact with each other, forwardly and rearwardly of the neck 18, thereby permitting dust to intrude onto the slidably guiding surface through the gaps B. Furthermore, during the movement, the forward end portion of the neck 18 disposed at the head in the advancing direction of the neck 18 is adapted to push open the abutting contact portions of the shield members 14, 16 perpendicularly to the shielding surface constituted by the shield members 14, 16, thus presenting such disadvantages that high travelling resistance due to the friction of the neck 18 and the like.

SUMMARY OF THE INVENTION

It is therefore the primary object of the present invention to provide a dust excluding device being high in dust excluding performance and having a low traveling resistance caused by the movement of the movable member.

To achieve the abovedescribed object, the present invention contemplates that, in a dust excluding device comprising: flexible shield members disposed at opposite sides of an opening formed in a hollow casing along a line of movement of a movable member and having the forward ends thereof being brought into abutting contact with each other; and a neck adapted to locally push open the abutting contact portions of the shield members, for imparting a displacement of the movable member at the outside of the hollow casing to the interior of the hollow casing through the opening; at least at localities brought into contact with the abutting contact portions of the shield members, the end portions of the neck in the moving directions thereof are each formed into a letter 'V' shape, the tip of which obliquely recedes from inside to outside of the hollow casing.

Further, the abovedescribed object can be achieved by an arrangement according to the present invention that the end portions each formed into a letter 'V' shape are curved as viewed in the lateral direction.

Further, the abovedescribed object can be achieved by an arrangement according to the present invention that the end portions each formed into a letter 'V' shape are downwardly convex.

Further, the abovedescribed object can be achieved by an arrangement according to the present invention that at least portions of the opposite side surfaces of said neck brought into sliding contact with the abutting contact portions of said shield members are each formed into an inclined surface obliquely receding from the interior to the exterior of the hollow casing.

Further, the abovedescribed object can be achieved by an arrangement according to the present invention that the inclined surfaces of the neck are curved as viewed from the direction of movement of the neck.

Further, the abovedescribed object can be achieved by an arrangement according to the present invention that the inclined surfaces of the neck are concavely curved as viewed from the direction of movement of the neck.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
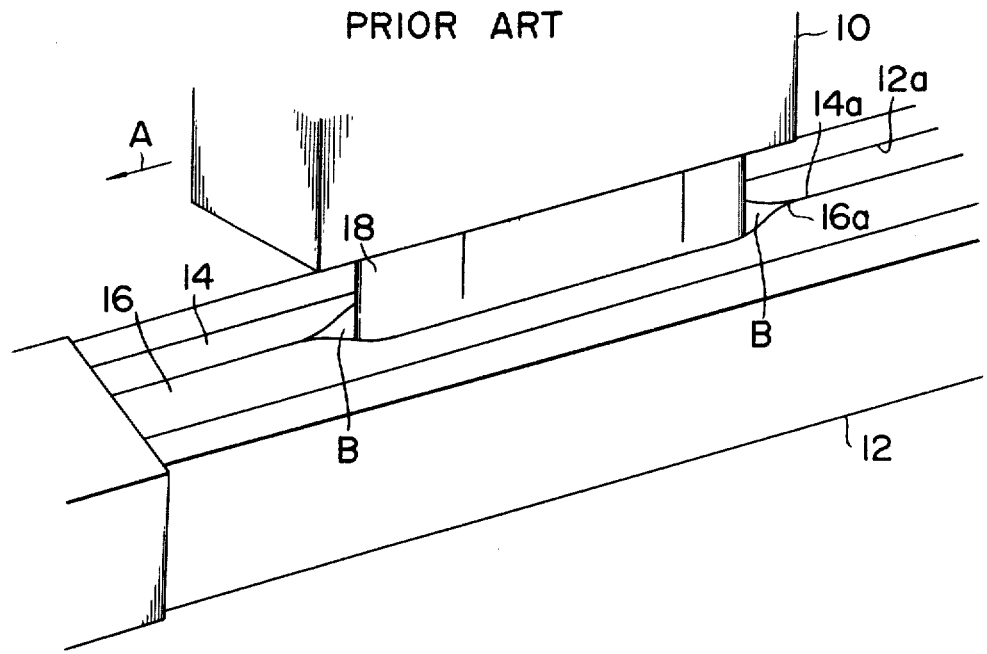
FIG. 1 is a perspective view showing the linear scale type measuring instrument in which an example of the conventional dust excluding device is adopted.
Figure 2:
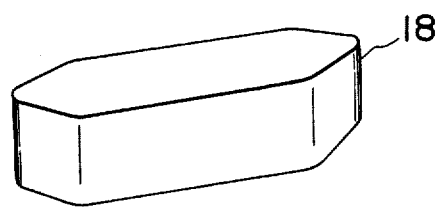
FIG. 2 is a perspective view showing the form of the neck of detector in the example of the prior art.
Figure 3:
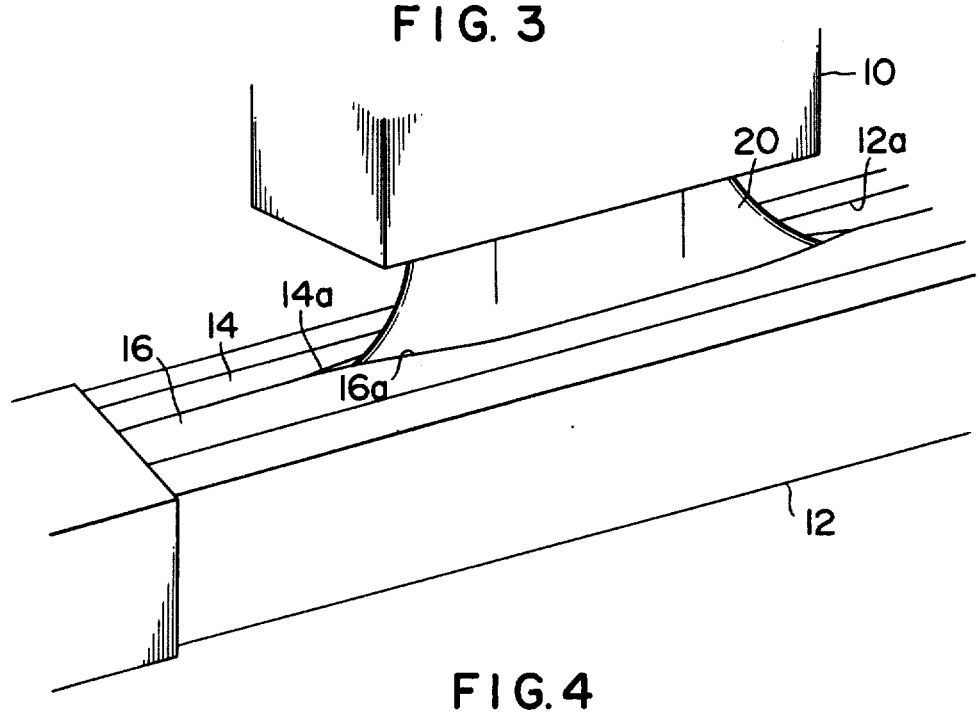
FIG. 3 is a perspective view showing the linear scale type measuring instrument in which is adopted a dust excluding device embodying the present invention.
Figure 4:
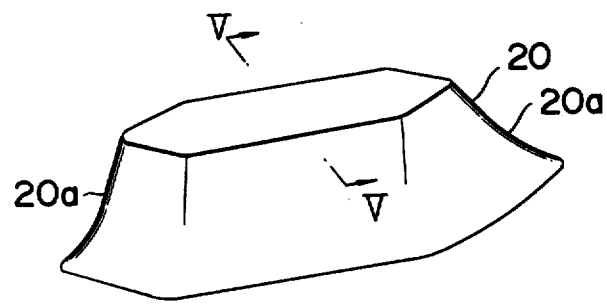
FIG. 4 is a perspective view showing the form of the neck of detector in the abovedescribed embodiment.

Detailed description will hereunder be given of the embodiments of the present invention with reference to the drawings. As shown in FIG. 3, this embodiment is of such an arrangement that, in a dust excluding device of a linear scale type measuring instrument similar to a conventional one, comprising: flexible shield members 14, 16 made of rubber for example, disposed at opposite sides of an opening 12a formed in a hollow casing 12 along a line of movement of a detector 10 being a movable member and having the forward ends 14a, 16a thereof being brought into abutting contact with each other; and a neck 20 adapted to locally push open the abutting contact portions of the shield members 14, 16, for imparting a displacement of the detector 10 at the outside of the hollow casing 12 to the interior of the hollow casing 12 through the opening 12a; opposite end portions 20a of the neck 20 are each formed into a letter 'V' shape, the tip of which obliquely recedes from inside to outside of the hollow casing 12, as shown in FIG. 4. Other points are similar to the aforesaid example of the prior art, so that detailed description will be omitted.

In this embodiment, the forward end portions 14a, 16a of the shield members 14, 16 are slightly pushed open even upwardly in FIG. 3 by the end portions 20a of the neck 20, whereby no gaps are formed between the end portions 20a of the neck 20 and the forward end portions 14a, 16a of the shield members 14, 16 so that the dust excluding effects can be increased. Furthermore, during the movement, the forward end portion 20a disposed at the head in an advancing direction of the neck not only pushes the shield members 14, 16 perpendicularly to the shielding surface but also opens the shield members 14, 16 in a manner to bend slightly upwardly in the drawing, whereby frictional resistance is decreased, so that the neck 20 can be smoothly moved.

Figure 5:
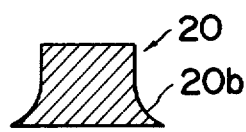
FIG. 5 is a sectional view taken along the line V—V in FIG. 4.

Here, as shown in FIG. 5, opposite side surfaces of the neck 20 are also inclined at their portions brought into contact with the shield members 14, 16 in a manner to be progressively decreased in width from the interior to the exterior of the hollow casing 12. Consequently, the frictional contact resistance between the neck 20 and the shield members 14, 16 are further decreased while the neck 20 moves.

Figure 6:
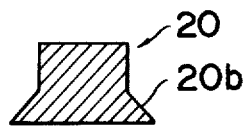
FIGS. 6 and 7 are sectional views similar to FIG. 5, showing other embodiments of the present invention.
Figure 7:
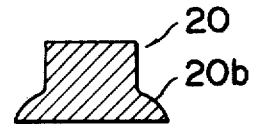

The states of inclination of the opposite end portions 20a and the opposite side surfaces 20b of the neck 20 may preferably be downwardly convex as shown in FIGS. 4 and 5 so that the degrees of push-up of the shield members 14, 16 can be decreased and the frictional resistances can be lowered in general. However, depending upon conditions including the shapes of the forward ends 14a, 16a of the shield members 14, 16 and the like, the states of inclination of the opposite end portions 20a and the opposite side surfaces 20b may be straight-lined or upwardly convex as shown in FIGS. 6 or 7.

Additionally, in the abovedescribed embodiment, the present invention has been applied to a linear scale type measuring instrument, it is to be understood that the invention is not limited to this specific form and that it can be likewise applied to sliding portions of machines in general.

It should be apparent to those skilled in the art that the abovedescribed embodiments are merely representative, which represent the applications of the principles of the present invention. Numerous and varied other arrangements can be readily devised by those skilled in the art without departing from the sprit and the scope of the invention.

What is claimed is:

1. A dust excluding device comprising: flexible shield members disposed at opposite sides of an opening formed in a hollow casing along a line of movement of a movable member and having the forward ends thereof being brought into abutting contact with each other; and a neck adapted to locally push open the abutting contact portions of the shield members, for imparting a displacement of the movable member at the outside of said hollow casing to the interior of said hollow casing through said opening; characterized in that, at least at localities brought into contact with the abutting contact portions of the shield members, the end portions of said neck in the moving directions thereof are each formed into a letter 'V' shape, the tip of which obliquely recedes from inside to outside of said hollow casing.

2. A dust excluding device as set forth in claim 1, wherein said end portions each formed into a letter 'V' shape are curved as viewed in the lateral direction.

3. A dust excluding device as set forth in claim 2, wherein said end portions each formed into a letter 'V' shape are downwardly convex.

4. A dust excluding device as set forth in claim 1, 2 or 3, wherein at least portions of the opposite side surfaces of said neck brought into sliding contact with the abutting contact portions of said shield members are each formed into an inclined surface obliquely receding from the interior to the exterior of the hollow casing.

5. A dust excluding device as set forth in claim 4, wherein said inclined surfaces of the neck are curved as viewed from the direction of movement of the neck.

6. A dust excluding device as set forth in claim 5, wherein said inclined surfaces of the neck are concavely curved as viewed from the direction of movement of the neck.

* * * * *